(12) United States Patent
Ben-Amotz

(10) Patent No.: US 10,068,271 B1
(45) Date of Patent: Sep. 4, 2018

(54) SHOPPING WITH A PERSONAL DEVICE

(75) Inventor: Roey Ben-Amotz, Raanana (IL)

(73) Assignee: NCR Corporation, Atlanta, GA (US)

( * ) Notice: Subject to any disclaimer, the term of this patent is extended or adjusted under 35 U.S.C. 154(b) by 979 days.

(21) Appl. No.: 13/338,965

(22) Filed: Dec. 28, 2011

Related U.S. Application Data

(60) Provisional application No. 61/430,282, filed on Jan. 6, 2011.

(51) Int. Cl.
*G06Q 30/00* (2012.01)
*G06Q 30/06* (2012.01)
*G06Q 20/40* (2012.01)
*G06Q 20/12* (2012.01)
*G06Q 20/32* (2012.01)

(52) U.S. Cl.
CPC ......... *G06Q 30/0613* (2013.01); *G06Q 20/12* (2013.01); *G06Q 20/322* (2013.01); *G06Q 20/40* (2013.01)

(58) Field of Classification Search
CPC ........... G06Q 30/0601; G06Q 30/0261; G06Q 30/0207; G06Q 30/0633; G06Q 30/0613; G06Q 20/127
USPC .................................. 705/26.1, 27.1, 26, 27
See application file for complete search history.

(56) References Cited

U.S. PATENT DOCUMENTS

| | | | | |
|---|---|---|---|---|
| 4,503,499 A * | 3/1985 | Mason | .................... | G06Q 10/10 709/206 |
| 6,587,835 B1 * | 7/2003 | Treyz et al. | ................ | 705/14.64 |
| 7,200,566 B1 * | 4/2007 | Moore | .................... | G06Q 30/06 705/26.3 |
| 8,239,276 B2 * | 8/2012 | Lin | ..................... | G06Q 30/0601 705/26.1 |
| 8,751,316 B1 * | 6/2014 | Fletchall | .............. | G07G 1/0081 705/16 |
| 2010/0082447 A1 * | 4/2010 | Lin | ..................... | G06Q 30/0601 705/26.1 |
| 2010/0082485 A1 * | 4/2010 | Lin | ........................ | G06Q 20/12 705/44 |
| 2010/0082490 A1 * | 4/2010 | Rosenblatt | ............. | G06Q 20/32 705/64 |
| 2011/0145093 A1 * | 6/2011 | Paradise | ................ | G06Q 30/02 705/26.41 |
| 2012/0095820 A1 * | 4/2012 | Chandrasekaram | ... | G06Q 30/02 705/14.23 |

OTHER PUBLICATIONS

AisleBuyer.com: Intenet Archive Wayback Machine, archive.org, Nov. 16, Dec. 8, 2010; 4pgs.*
Sharma, Pranav: "An evaluation of e-payment systems and their application in mobile commerce," ProQuest Dissertations Publishing, Jun. 17, 2010 ProQuest Dialog #305051358, 150pgs.*
"Mobile Commerce," Anonymous OECD Digital Economy Papers, Jan. 16, 2007; ProQuest Dialog # 189840482, 56pgs.*

(Continued)

*Primary Examiner* — Robert M Pond
(74) *Attorney, Agent, or Firm* — Schwegman, Lundberg & Woessner

(57) ABSTRACT

The disclosure presents a network, system, method and computer readable medium for using a personal device when shopping at a store using the server associated with this store. As described in the disclosure, the communication between the personal device and the store server is indirect via an intermediary system.

6 Claims, 5 Drawing Sheets

(56) References Cited

OTHER PUBLICATIONS http://aislebuyer.com (Dec. 15, 2010).
"Mobile Retailing Blueprint—A Comprehensive Guide for Navigating the Mobile Landscape." May 21, 2010, A Joint White Paper sponsored by the National Retail Federation.
Len Lewis, "Stepping Out of Line," (Dec. 1, 2010), http://www.stores.org/STORES%20Magazine%20December%202010/stepping-out-line.

* cited by examiner

SHOPPING WITH A PERSONAL DEVICE

CROSS REFERENCE TO RELATED APPLICATIONS

This application claims the benefit of U.S. Provisional No. 61/430,282, filed Jan. 6, 2011, which is hereby incorporated by reference herein.

FIELD

The disclosure relates to shopping at a store.

BACKGROUND

A server associated with a physical store stores the list prices of items available for purchase at the store, as well as the available promotions and temporary price reductions (TPRs). At manned or self service checkouts, a scanner scans the barcode of an item and the effective price of the scanned item is received from the server. This effective price reflects the list price as well as all effective promotions and TPRs. In some stores, clients can use portable scanning devices, similar to the scanners at the checkouts, to scan items while shopping. In some cases, the same physical server can be associated with multiple stores.

It is also possible to shop at a shopping website. In this case, the customer visits a shopping website and interacts with a web-server to complete purchases. In a chain with a shopping website and one or more physical stores the effective prices and inventory of items at the website may be the same or different than the effective prices and inventory at the physical store(s).

Furthermore, in a chain with more than one physical store, the effective prices of items at one store are not necessarily the same as those at another store. For example, the list prices may vary depending on the location of the store (e.g. more expensive list prices at stores in more expensive neighborhoods), or for example there may be promotions and/or temporary price reductions available only at that store, etc. Similarly the inventory at one store may not necessarily be identical to the inventory at another store, for example due to different shopping population makeups. Therefore the content of the dataset of items associated with one store may be the same as or different than the content of the dataset of items associated with another store.

SUMMARY

In one aspect, the disclosed subject matter provides a network for shopping with a personal device, comprising: a personal device operable to communicate a request relating to shopping at a physical store; an intermediary system operable to receive a request relating to shopping from the personal device, to communicate the request to a server associated with the store, to receive a response to the request from the server, and to communicate the response to the personal device; and a server associated with the store operable to handle the request and to communicate a response to the request to the intermediary system.

In some examples the network further comprises: a client of the server, wherein the server is operable to handle the request by delegating fulfillment of the request to the client or to personnel associated with the client, and wherein the client provides an indication of fulfillment of the request to the server so that the server can communicate a response to the intermediary system.

In some examples the network further comprises: at least one system selected from a group comprising: shopping list provider system, loyalty provider system, additional item information system, or payment system wherein the intermediary system is further operable to communicate a request received from a personal device to at least one of the at least one system, to receive a response to the request from the at least one system, and to communicate the response to the personal device. In some cases of these examples, the intermediary system is further operable to compile a response to a request using data from a plurality of responses received by the intermediary system, wherein a response communicated to the personal device is the compiled response.

In some examples the network further comprises at least one firewall.

In some examples of the network, the personal device and the intermediary system are operable to communicate asynchronously, and the intermediary system and the store server are operable to communicate asynchronously.

In some examples of the network, the intermediary system is further operable to receive requests from a plurality of personal devices and to receive responses from a plurality of servers associated with a plurality of stores.

In some examples of the network, the personal device is operable to communicate requests relating to shopping at a store both while inside the store and while outside the store.

In some examples of the network the store server is the same store server that controls physical touch points at the store.

In another aspect, the disclosed subject matter provides an intermediary system for shopping at a physical store, comprising: a device handler operable to communicate with personal devices regarding shopping at stores, including being operable to receive requests from personal devices and including being operable to communicate responses to the personal devices; and a transaction handler operable to communicate with store servers regarding shopping at stores, including being operable to communicate requests to store servers and being operable to receive responses from the store servers.

In some examples, the intermediary system further comprises: a session handler operable to control access to logs of sessions involving personal devices and store servers, so that the device handler and the transaction handler can not concurrently access the same session log; wherein the device handler is further operable to register requests in session logs and access responses from the session logs and wherein the transaction handler is further operable to access requests from the session logs and register responses in the session logs.

In some examples, the intermediary system further comprises: at least one module operable to communicate with at least one webserver regarding shopping at stores including being operable to communicate requests to the at least one web server and being operable to receive responses from the at least one webserver.

In another aspect, the disclosed subject matter provides a method of an intermediary system communicating with a personal device regarding shopping at a physical store, comprising: receiving an indication of the physical store from a personal device; causing allocation of a log for a shopping session relating to shopping at the physical store using the personal device; when a request is received from the personal device, registering the request in the session log so that the request can subsequently be communicated to at least one server selected from a group comprising: server associated with the physical store and webserver; and when a response to the request has been registered in the session log, accessing the response and communicating the response to the personal device.

In some examples of the method the response includes a shopping list with item barcodes.

In another aspect, the disclosed subject matter provides a method of an intermediary system communicating with a server associated with a physical store regarding shopping at the store, comprising: receiving notification of a new session log relating to shopping at the physical store; when a request has been registered in the session log which requires a response from the store server, accessing the request and communicating the request to the store server, and receiving a response from the store server and registering the response in the session log.

In some examples of the method, the response includes an indication that a behind the counter item is ready for pickup.

In another aspect, the disclosed subject matter provides a method of an intermediary system enabling indirect communication between a personal device and a server associated with a store regarding shopping at the store, comprising: receiving an indication of the store from the personal device; receiving a request relating to shopping from the personal device; communicating the request to a server associated with the store; receiving a response to the request from the store server, and communicating the response to the personal device.

In another aspect, the disclosed subject matter provides an integrated store server operable to receive requests from clients and requests from personal devices via an intermediary system, and to communicate responses to the clients and responses to the personal devices via the intermediary system.

In another aspect, the disclosed subject matter provides a computer program product comprising a computer useable medium having computer readable program code embodied therein for an intermediary system communicating with a personal device regarding shopping at a physical store, the computer program product comprising: computer readable program code for causing the computer to receive an indication of the physical store from a personal device; computer readable program code for causing the computer to cause allocation of a log for a shopping session relating to shopping at the physical store using the personal device; computer readable program code for causing the computer to, when a request is received from the personal device, register the request in the session log so that the request can subsequently be communicated to at least one server selected from a group comprising: server associated with the physical store and webserver; and computer readable program code for causing the computer to, when a response to the request has been registered in the session log, access the response and communicate the response to the personal device.

In another aspect, the disclosed subject matter provides a computer program product comprising a computer useable medium having computer readable program code embodied therein for an intermediary system communicating with a server associated with a physical store regarding shopping at the store, the computer program product comprising: computer readable program code for causing the computer to receive notification of a new session log relating to shopping at the physical store; computer readable program code for causing the computer to, when a request has been registered in the session log which requires a response from the store server, access the request and communicate the request to the store server; and computer readable program code for causing the computer to receive a response from the store server and register the response in the session log.

In another aspect, the disclosed subject matter provides a computer program product comprising a computer useable medium having computer readable program code embodied therein for an intermediary system enabling indirect communication between a personal device and a server associated with a store regarding shopping at the store, the computer program product comprising: computer readable program code for causing the computer to receive an indication of the store from the personal device; computer readable program code for causing the computer to receive a request relating to shopping from the personal device; computer readable program code for causing the computer to communicate the request to a server associated with the store; computer readable program code for causing the computer to receive a response to the request from the store server, and computer readable program code for causing the computer to communicate the response to the personal device.

BRIEF DESCRIPTION OF THE DRAWINGS

In order to understand the subject matter and to see how it may be carried out in practice, examples will be described, with reference to the accompanying drawings, in which.

DETAILED DESCRIPTION OF THE DRAWING

Described herein are some examples of shopping with a personal device.

In the following detailed description, numerous specific details are set forth in order to provide a thorough understanding of the subject matter. However, it will be understood by those skilled in the art that some examples of the subject matter may be practiced without these specific details. In other instances, well-known methods, procedures and components have not been described in detail so as not to obscure the description.

As used herein, the phrase "for example," "such as", "for instance" and variants thereof describe non-limiting examples of the subject matter.

Reference in the specification to "one example", "some examples", "another example", "other examples, "one instance", "some instances", "another instance", "other instances", "one case", "some cases", "another case", "other cases" or variants thereof means that a particular described feature, structure or characteristic is included in at least one example of the subject matter, but the appearance of the same term does not necessarily refer to the same example.

It should be appreciated that certain features, structures and/or characteristics disclosed herein, which are, for clarity, described in the context of separate examples, may also be provided in combination in a single example. Conversely, various features, structures and/or characteristics disclosed herein, which are, for brevity, described in the context of a single example, may also be provided separately or in any suitable sub-combination.

Unless specifically stated otherwise, as apparent from the following discussions, it is appreciated that throughout the specification discussions utilizing terms such as "receiving", "determining", "communicating", "handling", "delegating", "transmitting", "sending", "transferring", "providing", "compiling", "controlling", "accessing", "registering", "causing", "allocating", "creating", "notifying", obtaining", "executing", "allowing", "using", "deciding", "indicating", "identifying", "examining", "analyzing", "evaluating", "performing", "coordinating", or the like, refer to the action and/or processes of any combination of software, hardware and/or firmware. For example, these terms may refer in some cases to the action and/or processes of a programmable machine, that manipulates and/or transforms data represented as physical, such as electronic quantities, within the programmable machine's registers and/or memories into other data similarly represented as physical quantities within the programmable machine's memories, registers or other such information storage, transmission or display elements.

Figure 1:
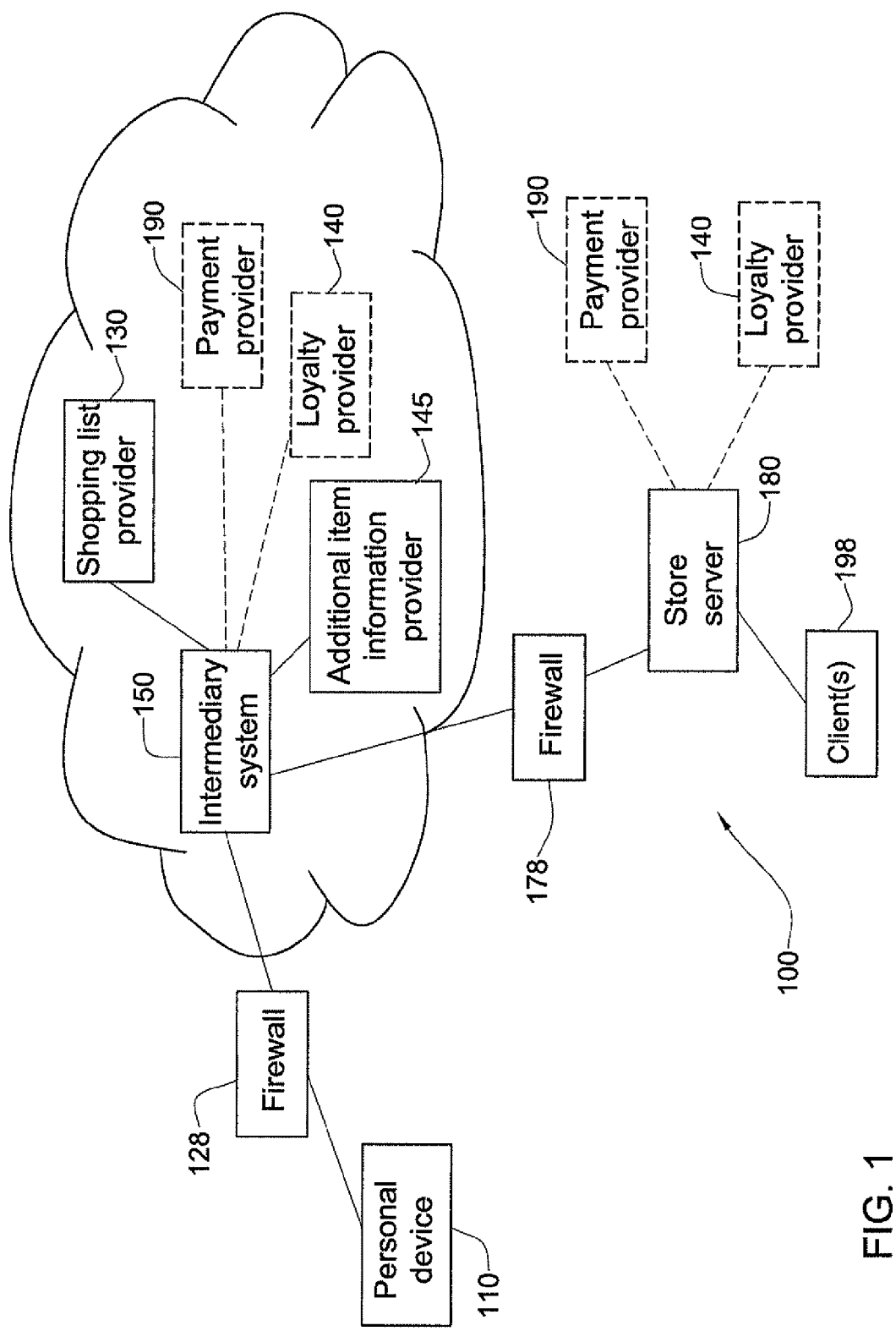
FIG. 1 is a block diagram schematically illustrating one example of a network for shopping with a personal device, in accordance with the presently disclosed subject matter.

Referring now to the figures in more detail, FIG. 1 is a block diagram schematically illustrating one example of a network 100 for shopping with a personal device, in accordance with the presently disclosed subject matter. In the illustrated example, network 100 includes one or more personal devices 110, one or more intermediary systems 150, and one or more servers 180 each associated with one or more (physical) stores (herein termed store server(s)). Optionally network 100 also includes one or more shopping list provider systems 130, one or more loyalty provider systems 140, one or more additional item information provider systems 145, one or more payment providers 190 and/or one or more clients 198 of store server(s) 180.

For simplicity of illustration and description, one personal device 110, shopping list provider system 130, loyalty provider system 140, additional item information provider system 145, intermediary system 150, store server 180, payment provider 190, and client 198 are illustrated in network 100 of FIG. 1 and described herein with reference to FIG. 1. However depending on the example, there may be one or more of each of personal device 110, intermediary system 150, and store server 180 in network 100. Similarly depending on the example, there may be zero, one, or more than one of each of shopping list provider 130, loyalty provider system 140, additional item information provider system 145, payment provider 190 and client 198 in network 100.

In the illustrated example, intermediary system 150 is operable to act as an intermediary for communications between store server 180 and personal device 110. In some cases, intermediary system 150 additionally is also operable to act as an intermediary for communications between personal device 110 and one or more other system(s) such as system(s) 130 associated with shopping list provider(s), system(s) 140 associated with loyalty provider(s), system(s) 145 associated with provider(s) of additional item information, and/or system(s) 190 associated with payment provider(s), etc. Therefore, intermediary system 150 in effect is operable to enable indirect communication between personal device 110 and store server 180 (and optionally between personal device 110 and other system(s)). In some cases, the exact location of intermediary system 150 (or the exact locations, if intermediary system 150 is dispersed over a plurality of locations) is/are not necessarily important as long as intermediary system 150 is operable to enable such indirect communication.

In the illustrated example, personal device 110 is operable to shop. For instance, personal device 110 may be operable to conduct a shopping session via intermediary system 150.

Additionally or alternatively, personal device 110 may be operable, for instance, to communicate with intermediary system 150. In some cases personal device 110 complies with the International Mobile Telecommunications-2000 (IMT-2000) (also known as the 3G or 3rd Generation standards). In some cases, personal device 110 is a smartphone. In some cases communication between personal device 110 and intermediary system 150 is via a socket connection, is asynchronous, and/or is secured by a firewall 128. In some cases, one or more web services facilitate communication between personal device 110 and intermediary system 150.

Additionally or alternatively, personal device 110 may be operable, for instance, to communicate to intermediary system 150 an indication of the relevant store for shopping and optionally indication(s) of other system(s) which may be required when shopping. For example, in some cases there may be a separate intermediary system for all stores in a chain and therefore communication with a particular intermediary system indicates that the relevant store relates to one of the stores in the chain and optionally that one or more of the loyalty provider, shopping list provider, provider of additional item information, and/or payment provider is related to that chain. In another example, more than one store (for example a group of individual stores, or a plurality of chains) may share the same intermediary system. In either example, the selection of the relevant store may in some cases be manual (i.e. the user chooses the relevant store) whereas in other cases the store closest to the current location of personal device 110 (for example as determined by location based services optionally included in device 110) may be automatically chosen. In other cases the relevant store may be selected semi-automatically. In some of these semi-automatic cases, the closest store as determined by location based services may be selected subject to user approval, or the user may select from among a plurality of offered choices of stores, where the choices offered are based on store distance as determined by location based services, etc. In either example, in some cases relevant other systems (e.g. loyalty provider, shopping list provider, payment provider additional item information provider) may be pre-configured for the chosen store, for instance by the user of personal device 110 and/or store management. Additionally or alternatively, in some cases of either example relevant other systems may be selected in real time by the user of personal device (for instance with no limitations on the selection, or limited to certain options).

Additionally or alternatively, personal device 110 may be operable for instance to receive input and/or to provide output. For example, personal device 110 may in some cases be operable to capture barcodes of items as a technique for providing an item barcode. The barcode can be captured, for example, by a digital camera embedded in personal device 110. In another example, additionally or alternatively, personal device 110 may in some cases be operable to receive input from a user of the device, for example via a keypad, stylus, mouse, microphone, etc. and/or provide output to a user of the device, for example via a display, printer, speaker, etc. In another example, additionally or alternatively, personal device 110 may receive location input from location based services.

In the illustrated example, store server 180 is operable to communicate with intermediary system 150. In some cases communication between store server 180 and intermediary system 150 is secured by a firewall 178 (or by the same firewall 128). Additionally or alternatively, in some cases, one or more web services facilitate communication between store server 180 and intermediary system 150. Additionally or alternatively, in some instances, communication between store server 180 and intermediary system 150 may be asynchronous.

In some cases, store server 180 is behind a NAT (network address translation) rather than being exposed like a typical web server. Therefore in some of these cases, store server 180 may poll intermediary system 150 at regular intervals.

In the illustrated example, intermediary system 150 may optionally communicate with one or more server(s) related to one or more other system(s), such as a server of shopping list provider 130, a server of loyalty provider 140, a server of a payment provider, and/or a server of additional item information provider 145. In some cases, communication with one or more of these servers may be facilitated through Application Programming Interface(s) "API(s)" and/or proxy/ies, and/or secured by firewall(s).

Additionally or alternatively, in some cases, one or more of the other system(s) may be operable to directly communicate with store server 180 and therefore communication between personal device 110 and the other system is via both intermediary system 150 and store server 180. For instance, in FIG. 1 two possibilities for loyalty provider 140 are shown by broken lines, with one possibility being that the loyalty provider system is operable to directly communicate with store server 180 and another possibility being that the loyalty provider system is not operable to directly communicate with store server 180. Similarly, in FIG. 1 two possibilities for payment provider 190 are shown by broken lines with one possibility being that the payment provider system is operable to directly communicate with store server 180 and another possibility being that the payment provider system is not operable to directly communicate with store server 180. In some cases where there is direct communication between provider (e.g. loyalty, payment) and a store server, the indirect communication between personal device 110 and store server 180 via intermediary 150 (for example when requesting to pay, or when a loyalty identifier has been provided) may trigger (or affect) communication between the provider and store server 180, or vice versa. Direct communication between store servers and payment provider systems or between store servers and loyalty provider systems is known in the art and will therefore not be further elaborated upon.

An example of a shopping list provider is www.rememberthemilk.com™. An example of a loyalty provider is www.Nectar.com. An example of a provider of additional item information is the US Food and Drug Administration at www.FDA.gov. An example of a payment provider is mtx-eps.com, a credit card defrayer.

In some examples store server 180 is operable to communicate directly with one or more clients 198 (physical touch points) such as manned point of sale terminals (checkouts), self service point of sale terminals, weighing stations, portable or fixed scanners, service stations, manager terminals etc. Depending on the example, the functionality of store server 180 relating to servicing personal device 110 may be physically separated or not physically separated from the functionality relating to servicing the physical touch points. In some cases, the indirect communication between personal device 110 and store server 180 via intermediary 150 may trigger (or affect) communication between a client and store server 180, or vice versa. For example, in some of these cases, a shopper may use personal device 110 to request the ordering of an item which is not on the shelf but behind the counter and therefore must be provided to a shopper by service personnel (e.g. deli, fish, cheese, pastry, prescription medicine). The order may reach a service station client 198 (via intermediary system 150 and store server 180) which is associated with the service personnel. Once the order has been prepared by service personnel a "ready for pickup" notice may be sent by service station client 198 (via store server 180 and intermediary system 150) and may be received (possibly with other data such as price, etc) by personal device 110. In this example, the shopper may dispense with waiting in line while placing the order and while the order is being filled and only approach the service personnel when the order is ready for pickup.

As mentioned above, intermediary system 150 is operable to communicate both with personal device 110 and with store server 180 (and optionally with other systems such as loyalty provider, shopping list provider, payment provider and/or additional item information provider) regarding shopping at a physical store by a user of personal device 110. Therefore intermediary system 150 in effect allows indirect communication between personal device 110 and store server 180 (and optionally between personal device 110 and other system(s)). In some cases, this indirect communication enables the transfer of requests from personal device 110 to store server 180 (and optionally to other system(s)) and the transfer of responses from store server 180 (and/or optionally other system(s)) to personal device 110 via intermediary system 150. It is noted that in some cases a user of personal device 110 may be physically located inside or near a store at which the user wants to shop (although not necessarily), and store server 180 may be located inside or near the store at which the user wants to shop (although not necessarily), but the communication is still established via intermediary system 150 (which in some cases may be located far away from the store at which the user wants to shop). Although communication via a possibly distant intermediary system 150 is therefore counter-intuitive, in some cases there are advantages to personal device 110 and store server 180 communicating via intermediary system 150 rather than directly. Consider for example the prospect of using instead a WI-FI network for direct communication. A WI-FI network may be expensive to install in and/or around a store and therefore may not be desirable. Additionally or alternatively, in order to enable personal device 110 to communicate via WI-FI to store server 180, a user of personal device 110 would need to properly configure settings on personal device 110 which may be bothersome, making it less pleasurable to shop with personal device 110.

Furthermore, it may be counter-intuitive for personal device 110 to communicate via intermediary system 150 with store server 180 rather than communicate with a web-server of a shopping website affiliated with the same chain as the store. However, the web-server does not necessarily include the same inventory of items and/or effective item prices as store server 180. If there is a discrepancy, the shopping experience may be spoiled by the discrepancy, for instance due to the delay in and/or annoyance from correcting the discrepancy. Additionally or alternatively, a request by a user may in some cases require further communication to a client of store server 180 (for example as described above with regard to behind the counter items) and the web-server may not be operable to communicate with the client.

It is also noted that in some examples, store server 180 is operable to communicate directly with physical touch points such as manned point of sale terminals (checkouts), self service point of sale terminals, weighing stations, portable or fixed scanners, service stations, manager terminals, and indirectly with personal devices (via intermediary system 150). Therefore store server 180 provides an integrated shopping solution since store server 180 is operable to respond to requests received via direct communications and to requests received via indirect communications.

In some examples, store server 180 is operable to provide an integrated shopping solution because a "shopping cart" (i.e. a record of the shopping) for each current shopper is retained at store server 180. This shopping cart can therefore reflect actions occurring at the shopper's personal device as well as actions occurring at physical touch-points such as those listed in the previous paragraph. Store server 180 processes these actions regardless of their origins, seamlessly. For instance, a user can shop with a personal device and then check out at a manned or self service checkout. For instance, if a user uses his personal device to add a restricted item such as tobacco or alcohol to the shopping cart, the manager can approve or not approve the addition from a manager terminal. For instance, the user can weigh fruits, vegetables, etc at a weighing station, scan the personal device against the scale (or enter a numeric code) and the item will be added to the shopping cart. For instance, assuming the user did not use her personal device to scan all the items she will be purchasing, upon checkout the user can still enter the code of the transaction on her personal device so as to monitor the transaction, input delivery address, pay, swipe loyalty card, etc.

Figure 2:
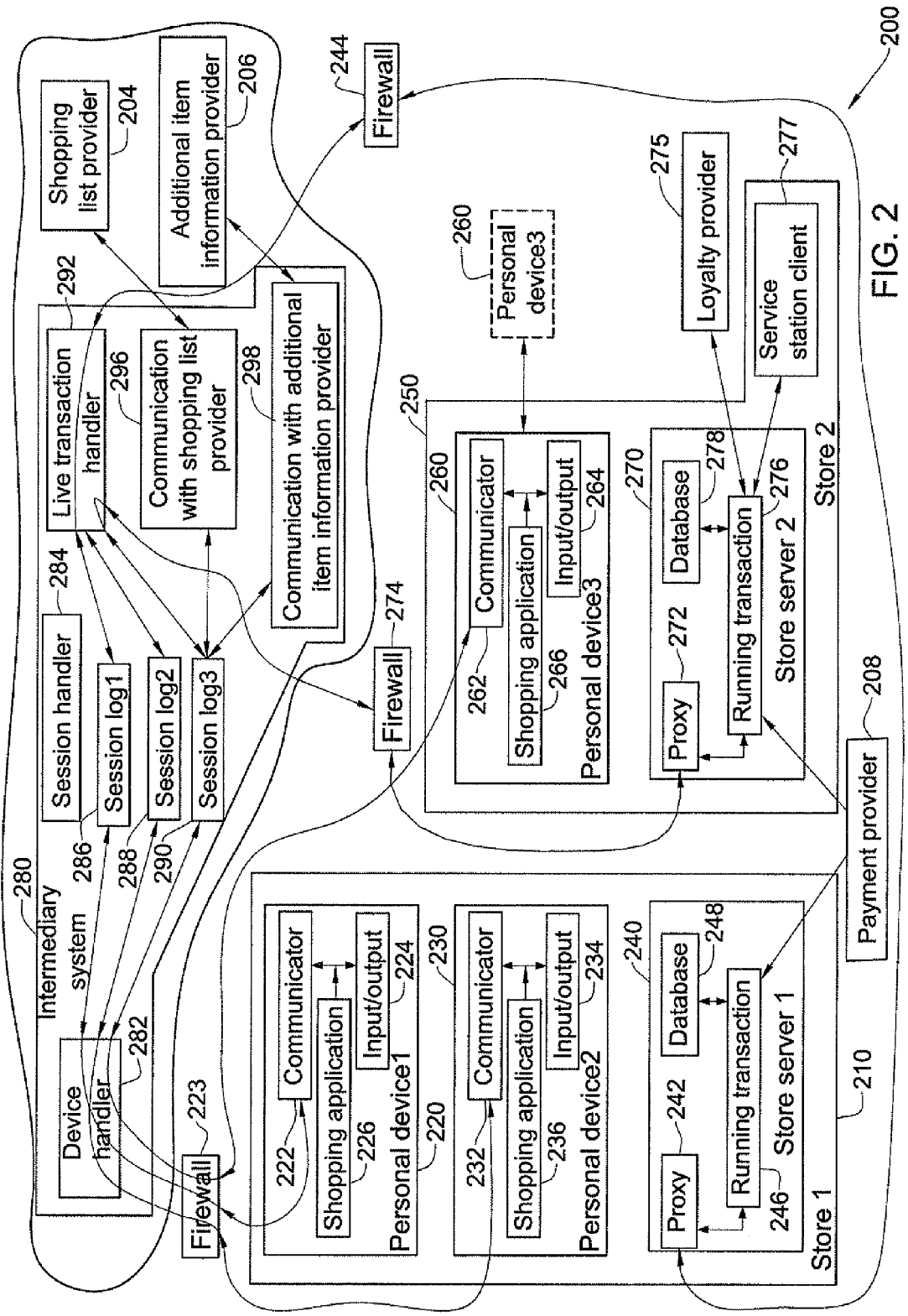
FIG. 2 is a block diagram schematically illustrating another example of a network for shopping with a personal device, in accordance with the presently disclosed subject matter.

FIG. 2 is a block diagram schematically illustrating another example of a network 200 for shopping with a personal device, in accordance with the presently disclosed subject matter.

In the illustrated example of network 200, there are currently two personal devices 220 and 230 located in a first store 210 which are operable to shop in accordance with the presently disclosed subject matter. There is currently one personal device 260 located initially outside of a second store 250 and then located inside second store 250, operable to shop in accordance with the presently disclosed subject matter. For instance, personal device 220, 230 and/or 260 may be examples of personal device 110 discussed above with reference to FIG. 1.

In the illustrated example, personal device 220, personal device 230 and personal device 260 include communicators 222, 232 and 262 respectively which are operable to communicate with intermediary system 280 (or more specifically with device handler 282). In some cases, communications between communicators 222, 232 and 262 and intermediary system 280 comply with the International Mobile Telecommunications-2000 (IMT-2000) (also known as the 3G or 3rd Generation standards), are secured by firewall 223 (or by different respective firewalls), are facilitated by web service(s), are via socket connection(s), and/or are asynchronous.

In the illustrated example, personal device 220, personal device 230 and personal device 260 include input/output modules 224, 234 and 264 respectively. Input/output modules 224, 234 and 264 may include for example one or more of the following inter-alia a camera, a keypad, a stylus, a mouse, a display, location based services, a microphone, a speaker, etc.

In the illustrated example, personal device 220, personal device 230 and personal device 260 include shopping application 226, 236 and 266 respectively. Shopping applications 226, 236 and 266 are operable to conduct the shopping sessions at the respective personal device end, including inter-alia processing data inputted via respective input/output modules or received via respective communicators, and/or providing data to be outputted via respective input/output modules or communicated via respective communicators.

Any of the modules in personal device 220, 230 and 260 may be made up of any combination of software, hardware and/or firmware that performs the functions as described and explained herein. In some cases, each of personal device 220, 230 and 260 include at least some hardware. In some cases, personal device 220, 230 and/or 260 may comprise a machine specially constructed for the desired purposes, and/or may comprise a programmable machine selectively activated or reconfigured by specially constructed program code. Alternatively to personal devices 220, 230 and 260 shown in FIG. 2, a personal device may in some examples include fewer, more and/or different modules than shown in FIG. 2. For instance, the input/output module in each personal device may be alternatively illustrated as a plurality of modules. Alternatively to the example shown in FIG. 2, the functionality of a personal device may in some examples be divided differently among the modules illustrated in FIG. 2. For instance, common functionality which can be used both for communicating and inputting/outputting may be shared by communicator and input/output modules. Alternatively to the example shown in FIG. 2, a personal device may in some examples include additional, less, and/or different functionality.

As mentioned above a server may be associated with one or more stores. In an example where a server is associated with a plurality of stores, the server may include datasets with the same or different content for each associated store. For simplicity's sake in the illustrated example of network 200, it is assumed that there is a store server 240 associated with first store 210 and a store server 270 associated with second store 250. For instance, server 240 and/or 270 may be examples of store server 180 discussed above with reference to FIG. 1. Although in FIG. 2 store server 240 is illustrated in being inside store 210 and store server 270 is illustrated as being inside store 250, in other examples, store server 240 may be partly or totally located outside of store 210 and/or store server 270 may be partly or totally located outside of store 250.

In the illustrated example, store servers 240 and 270 include proxies 242 and 272 respectively operable to communicate with intermediary system 280 (and more specifically with live transaction handler 292). For instance, intermediary system 280 (e.g. live transaction handler 292 discussed below) may register proxy 242 when first needed and proxy 272 when first needed and proxies 242 and 272 may continue to check for any new requests targeting store servers 240 and 270 respectively. In some cases, registration may happen at the beginning of the business day and may stop at the end of the business day. In a 24×7 business environment an additional proxy may in some cases be installed in a store server to secure 100% continuous service. In some cases, the proxy may stop for maintenance only. In some cases, where store server 240 and/or 270 are behind a NAT (network address translation) proxy 242 and/or 272 may poll live transaction handler 292 at regular intervals. In some cases, communications between intermediary system 280 and store servers 240 and 270 are secured by firewalls 244 and 274 respectively (or by a common firewall), one or more web services facilitate the communications, and/or the communications are asynchronous.

In the illustrated example, store servers 240 and 270 include running transaction modules 246 and 276 respectively operable to handle the transaction on the store server end. For instance, handling the transaction may include handing a request originating from a personal device. In some cases (e.g. a request to pay) handling the transaction may include communication with a payment system such as payment system 208 (which is an example of payment provider system 190 discussed above with reference to FIG. 1). In some cases, store servers 240 and 270 have access to databases 248 and 278 respectively (for example because the database is internal to the server or because the database is otherwise accessible by the server). In some of these cases handling the transaction by running transaction 246 or 276 may additionally or alternatively include accessing database 246 or 276 respectively. The disclosure does not impose limitations on the dataset content of database 248 or 278 and the dataset content may include any content such as number of items in inventory, list prices of items, promotions, temporary price reductions, etc.

In the case of running transaction module 276, the handling by running transaction module 276 of a transaction (e.g. a request originating from personal device 260) may in some instances include communication to one or more clients such as service station client 277. In one of these instances, communication with service station client 277 allows delegation of fulfillment of a request originating from personal device 260 to service station client 277 or to service personnel associated with service station client 277. Service station client 277 is an example of client 198 discussed above with reference to FIG. 1. In some cases with running transaction module 276, handling the transaction (e.g. a request from a user who is a loyalty customer) may include communication with a loyalty provider system such as loyalty provider system 275 (which is an example of loyalty provider 140 discussed above with reference to FIG. 1).

Although for simplicity of illustration, other types of clients 198 are not illustrated in FIG. 2, in some examples, store server 248 and/or 270 may have other type(s) of (physical touch point) clients such as manned point of sale terminals (checkouts), self service point of sale terminals (checkout), weighing stations, portable or fixed scanners, manager terminals etc. In these examples, running transaction 246 or 276 may also be operable to handle transactions from these client(s), thereby providing an integrated shopping solution for both transactions originating from client(s) and transactions originating from personal devices. The uniqueness, as well as the challenge, is to enable seamless change of the transaction ownership, between external elements which are the personal devices, and the more internal elements such as the store server and/or clients. There is therefore a high level of intimacy between the external and internal elements, without compromising security and performance. The deli order (mentioned in previous sections) is a simple example of this complexity—when the transaction in some cases starts from the personal device, and can be completed and acknowledge at the store deli counter touch point, and paid for at either the store checkout (e.g. manned or self service) or at the personal device.

Any of the modules in store servers 240 and 270, provider systems 208 and 275, and client 277 may be made up of any combination of software, hardware and/or firmware that performs the functions as described and explained herein. In some cases, each of servers 240 and 270, provider systems 208 and 275, and client 277 includes at least some hardware. In some cases, store server 240 and/or 270 provider system 208 and/or 275, and/or client 277 may comprise a machine specially constructed for the desired purposes, and/or may comprise a programmable machine selectively activated or reconfigured by specially constructed program code.

Alternatively to the example shown in FIG. 2, store server 240 and/or 270 may in some examples include fewer, more and/or different modules than shown in FIG. 2. Alternatively to the example shown in FIG. 2 modules in store server 240 and/or modules in store server 270 may be dispersed over more than one unit, in the same location or different locations. For instance, store server 240 (or 270) may be divided into two servers with a first operable to handle transactions relating to personal devices and the second operable to handle transactions relating physical touch point clients. Alternatively to the example shown in FIG. 2, stores 210 and 250 may share the same server Alternatively to the example shown in FIG. 2, the functionality of store server 240 and/or 270 may in some examples be divided differently among the modules illustrated in FIG. 2. Alternatively to the example shown in FIG. 2, store server 240 and/or 270 may in some examples include additional, less, and/or different functionality.

In the illustrated example, network 200 also includes intermediary system 280. Intermediary system 280 is an example of intermediary system 150 discussed above with reference to FIG. 1. Depending on the example, intermediary system 280 may or may not be limited to communicating with stores from the same chain.

In the illustrated example intermediary system 280 includes device handler 282 operable to handle communication with personal device(s) (e.g. personal devices 220, 230, and/or 260), and a live transaction handler 292, operable to handle communication with store server(s) (e.g. store server 240 and/or store server 270). Optionally, intermediary system 280 includes one or more module(s) for handling communications with web-servers of other system(s) (e.g. in FIG. 2 there are two such modules, module 296 for communicating with shopping list provider web-server 204 and module 298 for communicating with a web-server 206 for providing additional item information). Shopping list provider web-server 204 and additional item information web-server 206 are respectively examples of shopping list provider system 130 and additional item information system 145 discussed above with reference to FIG. 1. In some cases, communication between intermediary system 280 and one or more web-servers such as web-servers 204 and 206 may be facilitated through API(s) and/or secured by firewall(s).

In the illustrated example, intermediary system 280 optionally also includes a session handler 284 operable to control access to session logs in memory by device handler 282, by live transaction handler 292, and/or by module(s) operable to handle communications with web-server(s) (e.g. modules 296 and 298) so that concurrent access to the same session log is not allowed. In the illustrated example, session log 286 is a record of a session involving personal device 220 and the store server 240, session log 288 is a record of a session involving personal device 230 and the store server 240, and session log 290 is a record of a session involving personal device 260, store server 270, shopping list provider system 204 and additional information provider system 206. Session handler 284 in some cases may be implemented as a semaphore, with the session logs 286, 288 and 290 the memory resources to which access is controlled.

Any of the modules in intermediary system 280 and in webservers 204 and 206 may be made up of any combination of software, hardware and/or firmware that performs the functions as described and explained herein. In some cases, each of intermediary system 280 and webservers 204 and 206 includes at least some hardware. In some cases, intermediary system 280, and/or webserver 204 and/or 206 may comprise a machine specially constructed for the desired purposes, and/or may comprise a programmable machine selectively activated or reconfigured by specially constructed program code.

Alternatively to the example shown in FIG. 2, intermediary system 280 may in some examples include fewer, more and/or different modules than shown in FIG. 2. Alternatively to the example shown in FIG. 2 modules in intermediary system 280 may be dispersed over more than one system, in the same location or different locations. Alternatively to the example shown in FIG. 2, the functionality of intermediary system 280 may in some examples be divided differently among the modules illustrated in FIG. 2. Alternatively to the example shown in FIG. 2, intermediary system 280 may in some examples include additional, less, and/or different functionality.

For instance, in the illustrated example, device handler 282 handles communications with all personal devices which communicate with intermediary system 280. However, in other examples, there may be a plurality of device handlers, for instance a separate device handler for each personal device currently communicating with intermediary system 280, a separate device handler for each store server in relation to which personal device(s) are currently communicating, a separate device handler for each group of a given number of personal devices, etc. In the illustrated example there is one transaction handler. However in other examples, there may be a plurality of transactions handlers, for instance a separate transaction handler for each store server, a separate transaction handler for each current session between a store server and personal device, a separate transaction handler for each group of a given number of store servers, etc. In the illustrated example there is one module corresponding to each webserver. However in other examples there may a module corresponding to each type of webserver (e.g. loyalty provider webserver, shopping list webserver, additional item information webserver, etc). Additionally or alternatively, in other examples there may be one module for all webservers. Additionally or alternatively, in other examples there may be a separate module corresponding to each current session for all participating web server(s), and/or a separate module corresponding to each current session for each participating web server.

Figure 3:
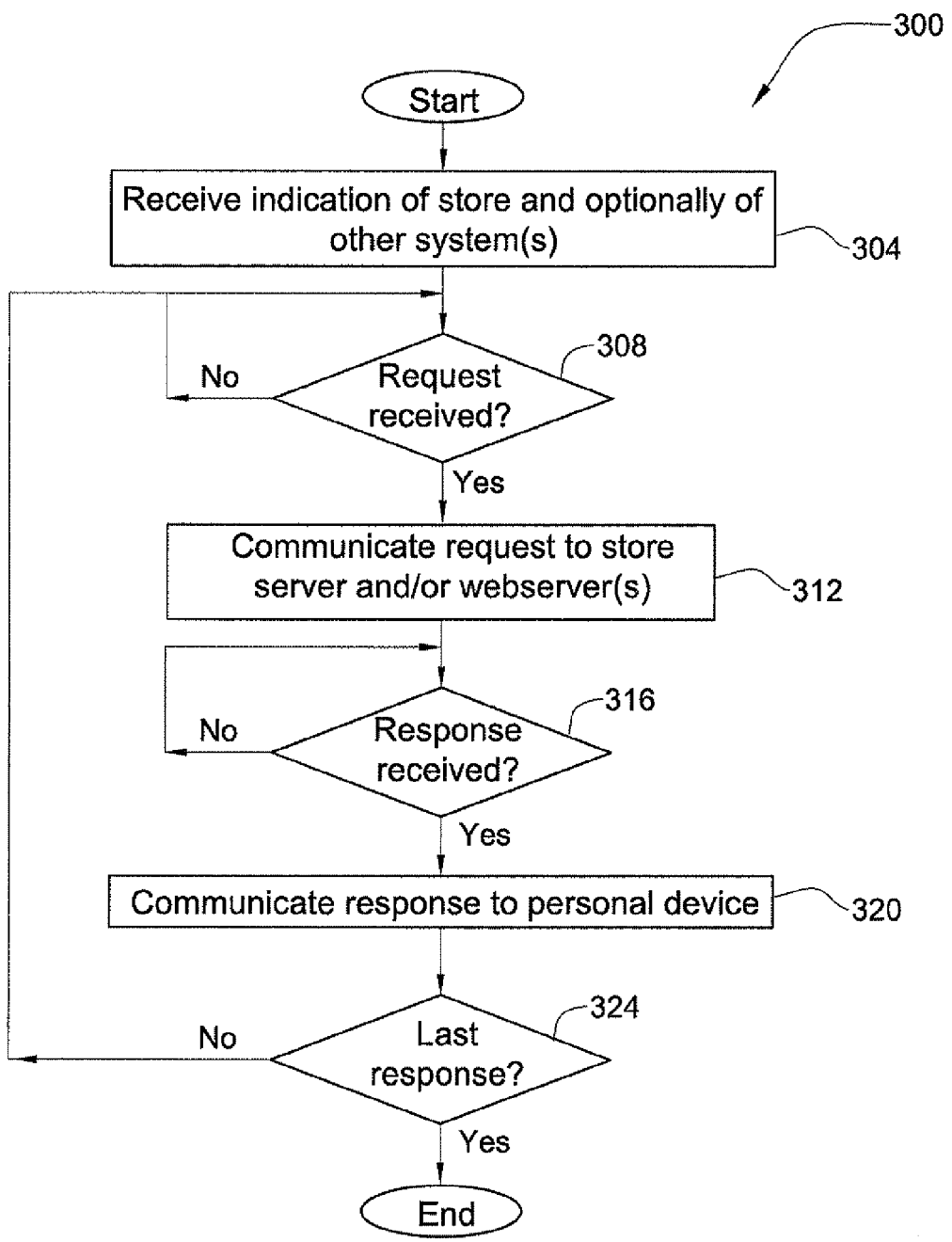
FIG. 3 is a flowchart illustrating an example of a method of an intermediary system enabling indirect communication between a personal device and a store server and/or webserver(s), in accordance with the presently disclosed subject matter.

FIG. 3 is a flowchart illustrating an example of a method 300 of an intermediary system enabling indirect communication between a personal device and a store server and/or webserver(s), in accordance with the presently disclosed subject matter. FIG. 3 will be discussed with reference to the example of network 200 of FIG. 2.

In the illustrated example, in stage 304, intermediary system 280 receives an indication of the relevant store at which the particular personal device (e.g. 230, 240 and/or 270) will be shopping. For instance, the user of the personal device may have used the input/output of the personal device to open a shopping application and therefore cause the communicator of the personal device to begin communicating with intermediary system 280, including communicating an indication of the relevant store. Examples of determination of the relevant store will now be provided. For example, in some cases there may be a separate intermediary system for a chain and therefore communication with a particular intermediary system indicates that the relevant store is one of the stores in the chain and optionally that one or more of the loyalty provider, shopping list provider, provider of additional item information, and/or payment provider is related to that chain. In another example, more than one store (for example a group of individual stores, or a plurality of chains) may share the same intermediary system. In either example (e.g. separate intermediary system per chain, or shared intermediary system), the relevant store may be selected manually, automatically or semi-automatically. For instance, the selection of the relevant store may in some cases be manual (i.e. the user chooses the relevant store) whereas in other cases the store closest to the current location of the personal device (for example as determined by location based services optionally included in the personal device) may be automatically chosen. Assuming instead semi-automatic selection, in some cases the closest store as determined by location based services may be selected subject to user approval, or the user may select from among a plurality of offered choices of stores, where the choices offered are based on store distance as determined by location based services, etc.

In some cases, intermediary system 280 also receives in stage 304 indications(s) of other system(s) relevant to the current shopping. For instance, the shopping application may also allow the user to select one or more other systems (example shopping list provider, loyalty provider, payment provider, and/or additional information provider), for instance inputting identifying information of the system(s). Additionally or alternatively, the shopping application may automatically select one or more other systems relating to the selected store (for example as pre-configured by the user or store management), and/or the application may provide choices of possible other system(s) from among which the user may select. In other cases, additionally or alternatively intermediary system 280 may select one or more other system(s) in stage 304 (for example as preconfigured by store management for the indicated store) or there may not be any other system(s) involved in the shopping.

In cases where there are other system(s) involved in the shopping, the user may for instance input user identifying information for those system(s) at this stage (which would therefore at this stage be received by intermediary system 280) or for instance later with respect to a request. Examples of user identifying information may include user name, password, identifying number, credit card information, etc. In other cases where there are other system(s) involved in the shopping, user identifying information for one or more of those other system(s) may have been previously configured in the shopping application by the user, and therefore may not need to be again inputted in order to be received by intermediary system 280 at this stage and/or later.

In the illustrated example, in stage 308 intermediary system 280 waits to receive a request from the particular personal device. Once a request is received (yes to stage 308), intermediary system 280 communicates the request in stage 312 to the server associated with the relevant store (e.g. store server 240, 270) and/or to one or more web-server(s) (e.g. 204, 206).

In the illustrated example, in stage 316 there is a wait until a response is received. Once the response is received (yes to stage 316), the response is communicated to the particular personal device in stage 320. In some cases, the response which is communicated to the particular personal device is a response compiled from responses received from a plurality of sources (e.g. store server and/or web-server(s)).

If this was the last response (yes to stage 324), for example because the user has ended the session (e.g. closed the shopping application), intermediary system 280 ends this session of indirect communication between the particular personal device, store server and/or webserver(s). If this was not the last response (no to stage 324) then intermediary system 280 returns to stage 308, waiting for a new request.

In some examples, intermediary system 280 may receive additional requests relating to the session before a response to a previous request has been communicated back to the particular personal device (i.e. stage 308 for a subsequent request may occur before stage 320 for a previous request). Depending on the example, requests relating to the same session may be handled one at a time (i.e. stage 312 for a subsequently received request waits until stage 320 for a previous request has been performed), or more than one request relating to the same session can be handled by intermediary system 280 at the same time and therefore intermediary system 280 does not need to wait until after communicating a response to a previous request before communicating an additional request from the same particular personal device to a store server and/or web-server(s). Assuming examples where more than request may be handled at the same time, responses to requests may necessarily be communicated to the particular personal device in the same order that the requests were received, or may possibly be communicated in a different order, depending on the example.

In some examples, intermediary system 280 may be enabling indirect communication between a plurality of personal devices and store server(s)/webserver(s) at the same time and therefore may be performing multiple instances of method 300 at the same time.

Figure 4:
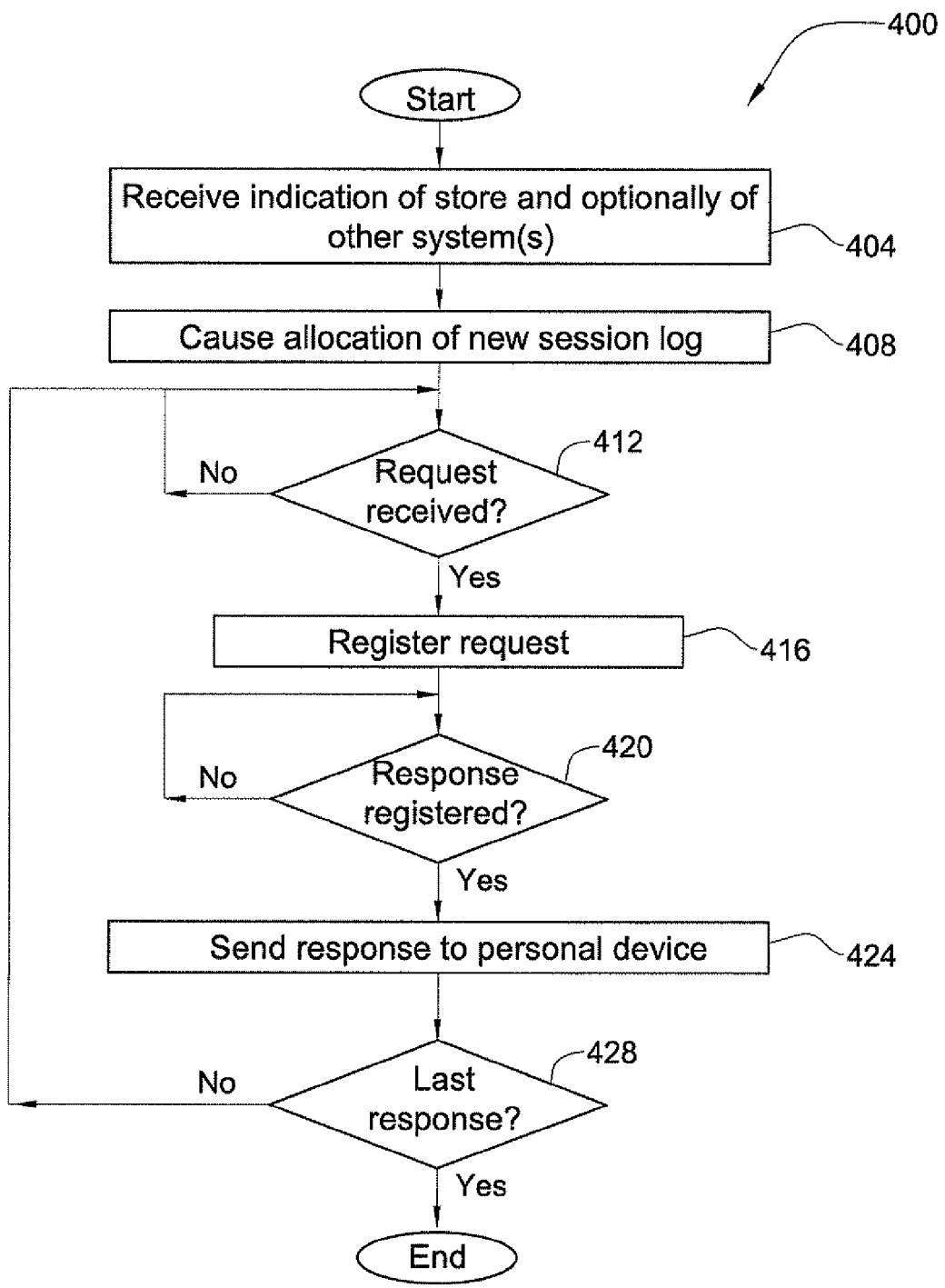
FIG. 4 is a flowchart illustrating an example of a method of an intermediary system communicating with a personal device, in accordance with the presently disclosed subject matter.
Figure 5:
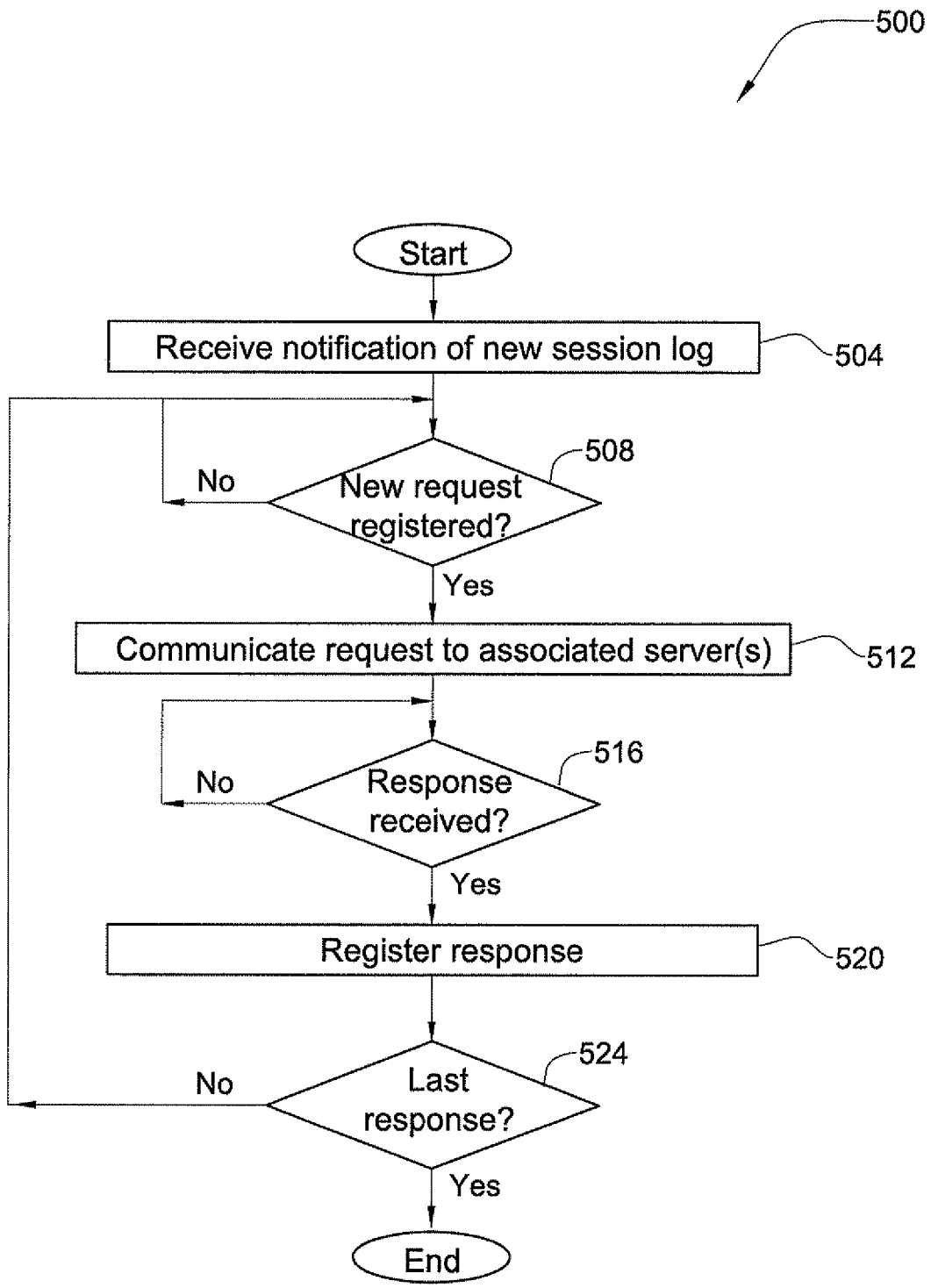
FIG. 5 is a flowchart illustrating an example of a method of an intermediary system communicating with a store server or web-server, in accordance with the presently disclosed subject matter.

In some cases, the indirect communication between a personal device and a store server/web-server(s) described with reference to FIG. 3 includes direct communication between intermediary system 280 and the personal device, and direct communication between intermediary system 280 and the store server/web-server(s), coordinated by a session log. FIG. 4 and FIG. 5 illustrate examples of such cases. FIGS. 4 and 5 will be discussed with reference to the example of network 200 of FIG. 2.

FIG. 4 is a flowchart illustrating an example of a method 400 of an intermediary system communicating with a personal device, in accordance with the presently disclosed subject matter. Device handler 282 may in some cases perform method 400. An example of device handler 282 can be Microsoft service buss, part of Azure operating system.

In the illustrated example, in stage 404 device handler receives an indication of the relevant store at which a particular personal device (e.g. 230, 240 and/or 270) will be shopping. In some cases, intermediary system 280 receives in stage 304 indications(s) of other system(s) relevant to the current shopping (and/or receives user identifying information for those system(s)) and/or intermediary system 280 selects such system(s). See above description of stage 304 for more details.

In the illustrated example, in stage 408 device handler 282 causes allocation of a session log (e.g. 286, 288, 290) for a session involving the particular personal device and the server of the relevant store (and optionally web-server(s) of other system(s)). For instance device handler 282 may ask session handler 284 allocate a session log.

In the illustrated example, in stage 412 device handler 282 waits to receive a request from the particular personal device. Once the request is received (yes to stage 412) the request is registered in stage 416 to the allocated session log. For instance, device handler 282 may ask session handler 284 for access to the session log and if no other access to the log is currently being made (e.g. by transaction handler 292, module 296, module 298), then session handler 284 may allow access by device handler 282 to register the request.

In the illustrated example, in stage 420 device handler 282 waits until a response has been registered in the session log. For instance, device handler 282 may periodically request access from session handler 284 to any session log which includes a request for which a response has not been returned to the querying personal device, to determine if the response has since been registered in the session log. If the response has been registered then device handler 282 accesses the response. In another instance, session handler 284 may inform device handler 282 when a response has been registered in a session log so that device handler 282 can access the response.

In the illustrated example, once a response has been registered (yes to stage 420), device handler 282 accesses the response and communicates the response to the particular personal device in stage 424. If this was the last response (yes to stage 428), for example because the user has ended the session (e.g. closed the application), device handler 282 ends communication with the personal device. If this was not the last response (no to stage 428) then device handler 282 returns to stage 412, waiting for another request.

In some examples, device handler 282 may receive additional requests relating to a session before a response to a previous request has been communicated back to the particular personal device (i.e. stage 412 for a subsequent request may occur before stage 424 for a previous request). Depending on the example, requests relating to the same session may be handled one at a time (i.e. stage 416 for a subsequently received request waits until stage 424 for a previous request has been performed), or more than one request relating to the same session can be handled by device handler 282 at the same time and therefore device handler 282 does not need to wait until after communicating a response to a previous request before handling an additional request from the same particular personal device. Assuming examples where more than request may be handled at the same time, responses to requests may necessarily be communicated to the particular personal device in the same order that the requests were received, or may possibly be communicated in a different order, depending on the example.

In some examples, device handler 282 may be handling a plurality of sessions and therefore may be performing multiple instances of method 400 at the same time.

FIG. 5 is a flowchart illustrating an example of a method 500 of an intermediary system communicating with a store server or web-server, in accordance with the presently disclosed subject matter. Each of transaction handler 292 and/or any of module(s) (e.g. module 296 and/or module 298) for communicating with web-server(s) may in some cases independently perform an instance of method 500.

In the illustrated example, in stage 504, notification of the new session log is received by the performer of this instance of method 500 (e.g. transaction handler 292, module 296, or module 298). For instance, when the performer is transaction handler 292, session handler 284 may notify transaction handler 292 of the relevant store and the new session log so that transaction handler 292 can register a proxy such as proxy 242 or 272 (if not already registered) at the associated store server (e.g. store server 240 or 270). If the performer is a module (e.g. 296 or 298) operable to communicate with any associated web-server(s) of other system(s) which will be involved in the shopping, session handler 284 may also notify the module of the new session log.

In the illustrated example, in stage 508, there is a wait until a new request has been registered in the session log. For instance, the performer of this instance of method 500 (for instance transaction handler 292, module 296 or module 298) may periodically request access from session handler 284 to any session log involving at least one associated server (e.g. store server(s), web-server(s)), to determine if a new request which requires a response from an associated server has been registered in the session log. In another instance, session handler 284 may inform the performer of this instance of method 500 when a new request has been registered in a session log which requires a response from an associated server.

In the illustrated example, if a new request has been registered which requires a response from at least one server associated with the performer of method 500 (yes to stage 508) then in stage 512 the performer of this instance of method 500 accesses the new request and communicates the new request to the associated server(s) from which a response is required. For instance, if the performer is transaction handler 292 then the new request is communicated to the proxy (e.g. 242 or 272) of the appropriate store server (e.g. 240 or 270). If the performer is module 296 or 298 then the request is communicated to web-server 204 or 206 respectively.

For instance, if the request has been communicated to a store server, the running transaction module (e.g. 246 or 276) may handle the determination of the response. In some cases determining the response may involve communication with one or more clients of the store server (e.g. service station client 277), and/or with other system such as loyalty system(s) (e.g. loyalty provider 275) and/or payment systems (e.g. payment provider 208).

In the illustrated example, in stage 516, there is a wait until a response is received. Once the response is received (yes to stage 516), the response is registered in stage 520 to the correct session log (e.g. 286, 288, 290). For instance, assuming transaction handler 292 is performing method 500, the response may be received from store server (e.g. store server 240, 260) and transaction handler 282 may request access to the correct session log from session handler 284. If no other access to the log is being made (e.g. by device handler 282, module 296, module 298), then session handler 284 may allow access by transaction handler 282 to register the response. Assuming for instance that instead module 296 or 298 is performing the method, the response may be received from web-server 204 or 206 respectively, and module 296 or 298 may request access to the correct session log from session handler 284. If no other access to the log is being made (e.g. by device handler 282, transaction handler 292 or different module 298 or 296 respectively), then session handler 284 may allow access by module 296 or 298 to register the response.

If this was the last response (yes to stage 524), for example because the user has ended the session (e.g. closed the shopping application), the performer of this instance of method 500 ends communication with the associated server with respect to the current session. If this was not the last response (no to stage 524) then the performer returns to stage 508, waiting for a new request.

Depending on the example, requests relating to the same session may be handled one at a time (i.e. stage 512 for a subsequently received request waits until stage 516 for a previous request has been performed), or more than one request relating to the same session can be handled by the performer of this instance of method 500 at the same time and therefore the performer does not need to wait until after receiving a response to a previous request before communicating a new request relating to the same session to the associated server. Assuming examples where more than request may be handled at the same time, responses to requests may necessarily be registered in stage 520 in the same order that the requests were received, or may possibly be registered in a different order, depending on the example.

In some examples, transaction handler 292, module 296 and/or module 298 may each be handling a plurality of sessions and therefore may be performing multiple instances of method 500 at the same time.

It is noted that in some cases the complete response to a request which is communicated by device handler to the particular personal device may require a compilation of responses from different sources such as store server, shopping list provider, additional information provider, etc. Therefore a request which requires a response which can be provided by one element (e.g. transaction handler 292, module 296 or module 298) may trigger the performance of stages 508 to 520 by that one element. However, a request which requires a compilation of responses provided by a plurality of elements may trigger the plurality of elements to perform different instances of stages 508 to 520.

Alternatively to the examples shown in FIGS. 3, 4 and/or 5, stages which are shown in FIGS. 3, 4 and/or 5 as being executed sequentially may in some examples be executed in parallel and/or stages shown in FIGS. 3, 4 and/or 5 as being executed in parallel may in some examples be executed sequentially. Alternatively to the examples shown in FIGS. 3, 4 and/or 5, method 300, 400 and/or 500 may in some examples include more, less and/or different stages than illustrated in FIGS. 3, 4 and/or 5. Alternatively to the examples shown in FIGS. 3, 4 and/or 5, stages may in some examples be executed in a different order than illustrated in FIGS. 3, 4 and/or 5.

Some additional examples will now be provided of network 200 and method(s) 400 and/or 500. For example, assume that personal devices 220 and 230 have both opened shopping applications while in store 210. Therefore, for personal device 220, store 210 may have been, for instance, automatically selected as relevant using location based services, and for personal device 230, store 210 may have been, for instance, semi-automatically selected as relevant. Indications that the relevant store is store 210 are therefore provided to device handler 282 by communicators 222 and 232. In respective instances of stage 404 device handler 282 receives each indication, and in respective instances of stage 408 device handler 282 requests from session handler 284 to allocate session logs 286 and 288 respectively.

Assume, for example, that personal device 260 has opened a shopping application before entering store 250. For instance the store 250 may have been selected as relevant by the user from among a list of possible stores associated with intermediary system 280. In some cases, the user may have inputted an identifier of the desired shopping list provider system 204 and/or identifying user information for system 204, or this information may have been previously configured in the shopping application on personal device 260. In some cases the user may have inputted an identifier for the loyalty provider system 275 associated with store 250 and/or identifying user information for system 204 or this information may have been previously configured in the shopping application on personal device 260. An indication that the relevant store is store 250, the loyalty identifier/user identifying information, and desired shopping list provider identifier/identifying user information are therefore provided to device handler 282 by communicator 262. In an instance of stage 404 the indication of the relevant store, the identifiers, and the identifying user information are received by device handler 282 and in an instance of stage 408 device handler 282 requests from session handler 284 to allocate session log 290.

Assuming the same examples, in instances of stage 504 transaction handler 292 is notified by session handler 284 that for session logs 286 and 288 the relevant store is 210. Therefore proxy 242 of store server 240 is registered (if not already registered) and communication regarding those sessions will be with proxy 242. Similarly in an instance of stage 504 transaction handler 292 is informed by session handler 284 that for session log 290 the relevant store is 210. Therefore proxy 272 of store server 270 is registered (if not already registered) and communication regarding that session will be with proxy 272. It is also assumed that it has been pre-configured on intermediary system 280 that for sessions involving store 270 additional information provider webserver 206 should participate, where necessary, and therefore in an instance of stage 504 module 298 is notified by session handler 284 of session log 290. Module 296 is informed by session handler 284 of session log 290 in an instance of stage 504 since information from shopping list provider webserver 204 may be required (due to the identifier/user identifying information previously received from personal device 260).

In the example with personal device 260, it is assumed that before entering the store or while inside the store, the user has requested his/her shopping list. The request is received by device handler 282 in an instance of stage 412, registered in session log 290 by device handler 282 in an instance of stage 424, retrieved by module 296 in an instance of stage 508, and communicated to shopping list provider web server 204 in an instance of stage 512. The response (i.e. shopping list) received from shopping list provider web server 204 by module 296 in an instance of stage 516 is registered by module 296 in session log 290, retrieved by device handler 282 in an instance of stage 420 and communicated to personal device 260 in an instance of stage 424.

Assume further that for at least some items on the shopping list sent to personal device 260, the shopping list includes sufficient identifying item information for running transaction 276 to identify the item. For instance, the shopping list may include bar codes for some or all items on the list. In some cases where the shopping list includes sufficient identifying information, the user may go through the list, confirming items, deleting items, requesting price checks, requesting additional item information etc. Assuming that the user has confirmed an item, the confirmation is considered a request to add the item to the shopping cart which is communicated to device handler 282. The identifying information of the item is received by device handler 282 as part of a request to add the item to the shopping cart in an instance of stage 412, the request is registered in session log 290 in an instance of stage 416, is retrieved by transaction handler 292 in an instance of stage 508 and is communicated to store server 270 in an instance of stage 512. Running transaction 276 may retrieve the item effective price from database 278 (or retrieve the list price, any promotion and/or temporary price reduction), add the price of the item to the total and in this case the price and the total may be the response to the request. In some cases the item may be a behind the counter item, and running transaction 276 may communicate the order to service station client 277 and wait until receiving an indication that the order is ready for pickup. In these cases the price, total and ready for pickup notification may be the response to the request. In some cases, running transaction may communicate with loyalty provider 275 so that the response will alternatively or additionally include loyalty information such as loyalty price (rather than non-loyalty price), points, etc. In any of the above cases, the response is received in an instance of stage 516 by transaction handler 292, registered in an instance of 520, retrieved by device handler 282 in an instance of stage 420 and sent to personal device 260 in an instance of stage 424.

In some cases, a request received (from personal device 260 by device handler 282) in an instance of stage 412 to add an item to the shopping cart may be considered to inherently include a request for additional information, or a separate request for additional information on the item may be received in an instance of stage 412 by device handler 282 from personal device 260. In these cases, the request is registered by device handler 282 in session log 290 in an instance of stage 416, is retrieved by module 298 in an instance of stage 508, and is communicated by module 298 to additional information web server 206 in an instance of stage 512. The response (i.e. additional information) received from additional information web server 206 by module 298 in an instance of stage 516 is registered by module 298 in session log 290. In one example, assuming the additional information is in response to a separate request, the response which will be communicated to personal device 260 will include the additional information. In another example, assuming the request for additional information was inherent in an "add an item to the shopping cart" request, the response which will be communicated to personal device 260 will be compiled from the additional information and a response registered by transaction handler 292 in session log 290. In either example, the response is retrieved from session log 290 by device handler 282 in an instance of stage 420 and communicated to personal device 260 in an instance of stage 424.

The user of personal device 260 may additionally or alternatively add items to the shopping cart that are not on the shopping list (and/or items on the list capture the barcodes of items which are not on the shopping list (or on the shopping list but without sufficient identifying item information), request price checks, and/or pay for the shopping etc, as will be described with respect to personal devices 220 and/or 230.

In an example with personal device 220, the user of personal device 220 captures the barcodes of items to be added to the cart with input camera 224. The barcode of an item is communicated to device handler 282 as part of a request to purchase the item. The request is received by device handler 282 in an instance of stage 412, the request is registered in session log 286 in an instance of stage 416, is retrieved by transaction handler 292 in an instance of stage 508 and is communicated to store server 240 in an instance of stage 512. Running transaction 246 may retrieve the item effective price from database 248 (or retrieve the list price, any promotion and/or temporary price reduction), add the price of the item to the total and in this case the price and the total may be the response to the request. The response is received in an instance of stage 516 by transaction handler 292 from store server 240, registered in an instance of 520, retrieved by device handler 282 in an instance of stage 420 and sent to personal device 220 in an instance of stage 424.

In an example with personal device 230, the user of personal device 230 captures the barcode of an item for which a price check is desired with input camera 234. The barcode of an item is communicated to device handler 282 as part of a request for a price check. The request is received by device handler 282 in an instance of stage 412, the request is registered in session log 288 in an instance of stage 416, is retrieved by transaction handler 292 in an instance of stage 508 and is communicated to store server 240 in an instance of stage 512. Running transaction 246 may retrieve the effective price of the item from database 248 (or retrieve the list price, any promotion and/or temporary price reduction), without adding the price to the total, and in this case the price may be the response to the request. The response is received in an instance of stage 516 by transaction handler 292 from store server 240, registered in an instance of 520, retrieved by device handler 282 in an instance of stage 420 and sent to personal device 230 in an instance of stage 424. In some cases, after receiving the price, the user may approve the price, which will cause a purchase request to be communicated to device handler 282. In some cases the request may include the previously captured barcode, whereas in other cases the barcode may not need to again be included. The request is received by device handler 282 in an instance of stage 412, the request is registered in session log 288 in an instance of stage 416, is retrieved by transaction handler 292 in an instance of stage 508 and is communicated to store server 240 in an instance of stage 512. Running transaction 246 may then add the price of the item to the total and in this case the price and the total may be the response to the request. In some cases, the item price may again need to be retrieved from database 248, whereas in other cases the item price may be remembered by running transaction 246 from before. The response is received in an instance of stage 516 by transaction handler 292 from store server 240, registered in an instance of 520, retrieved by device handler 282 in an instance of stage 420 and sent to personal device 230 in an instance of stage 424.

In an example with personal device 220, the user of personal device 220 may desire to pay for all items in the shopping cart. In this case a request to pay, along with credit card information, may be communicated to device handler 282. The request is received by device handler 282 in an instance of stage 412, the request is registered in session log 286 in an instance of stage 416, is retrieved by transaction handler 292 in an instance of stage 508 and is communicated to store server 240 in an instance of stage 512. Running transaction 246 may then communicate the total to payment provider system 208 affiliated with the received credit card number, along with the credit card information. When payment provider system 208 provides confirmation of payment to running transaction 246, the total and confirmation of payment may be included in the response to the request that is communicated to transaction handler 292. The response is received in an instance of stage 516 by transaction handler 292 from store server 240, registered in an instance of 520, retrieved by device handler 282 in an instance of stage 420 and sent to personal device 220 in an instance of stage 424.

The users of personal devices 230 and 260 may prefer to pay instead at a manned or self service checkout.

It will also be understood that the subject matter contemplates that a system or part of a system disclosed herein may be for example a suitably programmed machine. Likewise, the subject matter contemplates, for example, a computer program being readable by a machine for executing a method or part of a method disclosed herein. Further contemplated by the subject matter, for example, is a machine-readable memory tangibly embodying program code readable by the machine for executing a method or part of a method disclosed herein.

While examples of the subject matter have been shown and described, the subject matter is not thus limited. Numerous modifications, changes and improvements within the scope of the subject matter will now occur to the reader.

The invention claimed is:

1. An intermediary system for shopping at a physical store, comprising
   a hardware server configured to include
      a device handler residing as software in a non-transitory computer readable storage medium and the software executed by one or more processors of the hardware server, the device handler configured to communicate with personal devices regarding purchase transactions at stores and to communicate with loyalty information with loyalty providers for the purchase transaction, including being configured to receive requests from the personal devices, and wherein the device handler is an intermediary between the personal devices and the stores and between the personal devices and the loyalty providers, and wherein the request include barcode information transmitted to the device handler and the barcode information is associated with purchase items, and the device handler configured to communicate responses to said personal devices that are smartphones; a transaction handler residing as software in a non-transitory computer readable storage medium and the software executed by the one or more processors of the hardware server, the transaction handler configured to communicate with store savers and separately with the loyalty providers, the store servers configured to complete the purchase transactions regarding the purchase transactions at the stores using current locations of the personal devices to identify the stores and the store servers and confirming the stores and store servers based on received approvals from users operating the personal devices, the transaction handler also configured to communicate the requests to store servers and being configured to receive responses from said store servers, and wherein the transaction handler further configured to separately record loyalty details with the loyalty providers using the loyalty information; and
   the store servers, and wherein the handler is further configured to automatically select and interact with some systems for the purchase transactions and identify and interact with other systems for the purchase transactions that are preconfigured by the store servers.

2. The intermediary system of claim 1, wherein the server is further configured to include:
   a session handler residing as software in a non-transitory computer readable storage medium and the software executed by the one or more processors of the hardware server, the session handler configured to control access to logs of sessions involving personal devices and store servers, so that said device handler and said transaction handler cannot concurrently access the same session log;
   wherein said device handler is further configured to register requests in session logs and access responses from said session logs and wherein said transaction handler is further configured to access requests from said session logs and register responses in said session logs.

3. The intermediary system of claim 1, wherein the server is further configured to include:
at least one module configured to communicate with at least one webserver regarding the purchase transactions at the stores including being configured to communicate requests to said at least one web server and being configured to receive responses from said at least one webserver.

4. A method comprising:
receiving, by an intermediate server, an indication of a store from a personal device that is a smartphone, wherein the indication is a current location of the personal device and resolving the indication to the store based on the store being closest to the current location of the personal device and confirming the store based on a received approval from a user operating the personal device, wherein receiving further includes acting as an intermediary between the store and the personal device;
receiving, by the intermediate server, a request relating to a purchase transaction from said personal device, including barcode information included with a request to purchase an item;
communicating, by the intermediate server, said request to a store server that is responsible for completing the purchase transaction associated with said store and separately communicating loyalty information for the purchase transaction to a loyalty provider, wherein communication further includes acting as an intermediary between the personal device and the loyalty provider, and automatically interact, by the intermediate server, with some systems for the purchase transaction and automatically identify and interact, by the intermediate server, with other systems for the purchase transaction that are preconfigured by the store server;
receiving, by the intermediate server, a response to said request from said store server; and
communicating, by the intermediate server, said response to said personal device.

5. An apparatus, comprising
a hardware integrated store server configured to receive requests from clients and requests from personal devices to purchase items by receiving from the personal devices barcode information for the items, wherein the barcode information received indirectly from the personal devices through an intermediary system that resolves the store server based on current locations of the personal devices and confirming the store server based on received approvals from users operating the personal devices, and wherein the store server further configured to communicate responses to said clients and responses to said personal devices through communication with the intermediary system, and the store server further configured to complete purchase transactions involving the items, wherein the personal devices are smartphones, and wherein the intermediary system configured to record loyalty information separately from the store server for the purchase transaction with a loyalty provider by acting as an intermediary between the personal devices and the loyalty provider, and wherein the intermediary server further configured to automatically interact with some systems for the purchase transaction and automatically identify and interact with other systems that are preconfigured by the store server for the purchase transaction.

6. A non-transitory computer readable storage medium having executable instructions that when executed by an intermediate computer system performs a method to:
receive an indication of the store from a personal device that is a smartphone by identifying a current location of the personal device as the indication and resolving based on that current location the store as a particular store that is closest to the current location and confirming the store based on a received approval from a user operating the personal device wherein receive further includes act as an intermediary between the particular store and the personal device;
receive a request relating to a purchase transaction from said personal device, barcode information included with the request to purchase an item associated with the purchase transaction;
communicate said request to a server that is responsible for completing the purchase transaction associated with said store and separately communicate loyalty information for the purchase transaction to a loyalty provider, wherein communicate further includes acting as an intermediary between the personal device and the loyalty provider and automatically interact with some systems for the purchase transaction and automatically identify and interact with other systems for the purchase transaction that are preconfigured by a store server for the store;
receive a response to said request back from said store server; and
communicate said response to said personal device.

* * * * *